United States Patent
Nash et al.

(10) Patent No.: US 7,697,073 B2
(45) Date of Patent: Apr. 13, 2010

(54) IMAGE PROCESSING SYSTEM WITH HORIZONTAL LINE REGISTRATION FOR IMPROVED IMAGING WITH SCENE MOTION

(75) Inventors: Stephen R. Nash, Playa Del Rey, CA (US); Christopher A. Leddy, Huntington Beach, CA (US); Eric P. Lam, Diamond Bar, CA (US)

(73) Assignee: Raytheon Company, Waltham, MA (US)

( * ) Notice: Subject to any disclaimer, the term of this patent is extended or adjusted under 35 U.S.C. 154(b) by 1128 days.

(21) Appl. No.: 11/294,797

(22) Filed: Dec. 6, 2005

(65) Prior Publication Data

US 2007/0125936 A1     Jun. 7, 2007

(51) Int. Cl.
*H04N 5/21*     (2006.01)
*H04N 1/409*     (2006.01)

(52) U.S. Cl. ................. 348/607; 348/701; 348/620; 348/715; 348/448; 348/458; 382/275

(58) Field of Classification Search ............. 348/701, 348/607, 620, 447, 448, 452, 458, 715, 910; 382/275, 264
See application file for complete search history.

(56) References Cited

U.S. PATENT DOCUMENTS

| | | | | |
|---|---|---|---|---|
| 5,579,058 A | * | 11/1996 | Lee | 348/699 |
| 5,786,802 A | * | 7/1998 | Park | 345/660 |
| 7,432,979 B2 | * | 10/2008 | Tanaka | 348/448 |
| 2006/0176394 A1 | * | 8/2006 | Fazzini | 348/448 |

FOREIGN PATENT DOCUMENTS

| | | |
|---|---|---|
| EP | 0 371 678 A2 | 6/1990 |
| EP | 0 654 941 A2 | 5/1995 |
| GB | 2 259 827 A | 3/1993 |
| GB | 2 264 416 | 8/1993 |

* cited by examiner

*Primary Examiner*—David L Ometz
*Assistant Examiner*—Jean W Désir
(74) *Attorney, Agent, or Firm*—Leonard A. Alkov

(57) ABSTRACT

An image processing system and method. The image processing system acquires a first set of scan lines in at first field of image data and a second set of scan lines in a second field of image data; the second set of scan lines are interlaced relative to the first set of scan lines and performs a line by line correlation therebetween to provide an error signal or value. The first and second fields are buffered and coupled to a line-to-line correlator. The error signal is used to adjust either the first or the second set of scan lines to correct for skew or blur in the second field of image data.

15 Claims, 3 Drawing Sheets

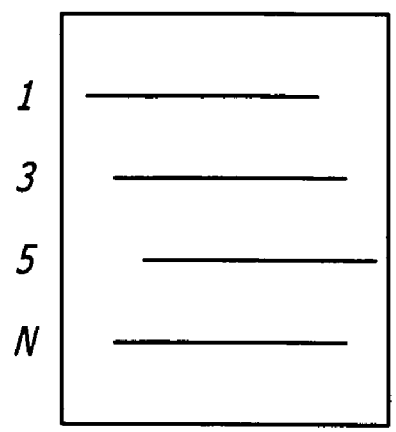
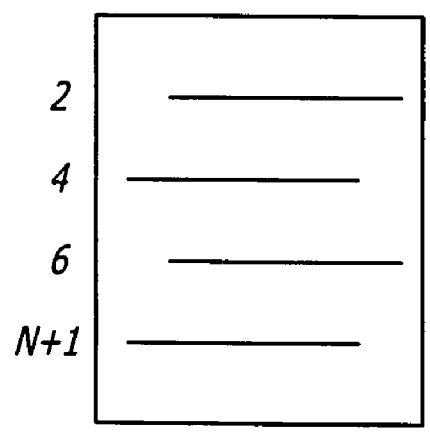
FIG. 3
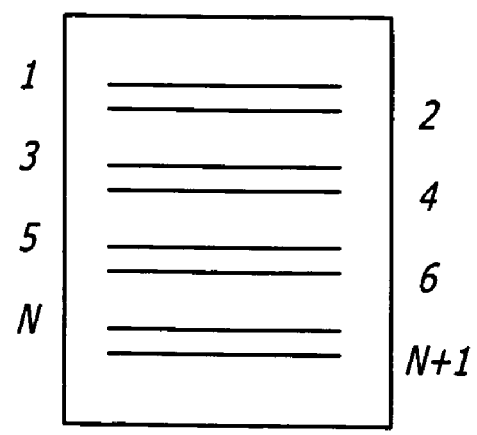

IMAGE PROCESSING SYSTEM WITH HORIZONTAL LINE REGISTRATION FOR IMPROVED IMAGING WITH SCENE MOTION

BACKGROUND OF THE INVENTION

1. Field of the Invention

The present invention relates to imaging systems. More specifically, the present invention relates to systems and methods for improving the image quality of images with scene motion.

2. Description of the Related Art

Visible and infrared imagers are used in a variety of commercial, industrial and military applications. For such applications, there is an ongoing need to improve the quality of the displayed image. For example, many older imagers and some newer imagers display frames of images using successive fields that are interlaced on a line-by-line basis. Thus, one field of image data is scanned onto the display on a line-by-line basis and then the next field is displayed with the lines of the second field interlaced between the lines of the first field. This interlaced scanning approach capitalizes on the inherent persistence of the display by which individual pixels on the screen remain or persist for a brief time period after a scanning electron beam is removed.

The interlaced scanning approach has certain advantages and therefore has been used for many displays. Unfortunately, when an object in scene being imaged moves at a speed higher than the field update rate of the display, the movement may cause a field-to-field skew when constructing a progressive frame of image data. While deinterlace algorithms are known in the art, common deinterlace algorithms do not correct this line-to-line skew.

In addition, these imagers typically use rolling integration detectors that sample each line in a field at different times. The integration of each line is typically staggered over a predetermined fixed time interval (e.g. 16 milliseconds). Another shortcoming associated with conventional interlaced scanning imagers then is due to the fact that scene motion with the integration time of the imager can also cause blurring and horizontal line misregistration.

Hence, a need exists in the art for a system or method for correcting line to line skew in imagers using an interlaced scanning scheme to display scenes having motion at or near the field scan rate or integration time thereof. That is, there is a need in the art for a system or method for deinterlacing fields and correcting line to line skew within a field of an imager.

SUMMARY OF THE INVENTION

The need in the art is addressed by the image processing system and method of the present invention. The inventive system acquires a first set of scan lines in a first field of image data and a second set of scan lines in a second field of image data. The second set of scan lines are interlaced relative to the first set of scan lines. In accordance with the invention, a line by line correlation is effected between the first set of scan lines and the second set of scan lines to provide an error signal or value in response thereto. In an illustrative implementation, the first and second fields are buffered and coupled to a line to line correlator which yields a correlation:

$$C = \sum_{n=-S}^{S} \sum_{m=F}^{L} (A_m)(B_{mn} - \bar{B}_n) \quad [1]$$

where A=a line from field 1; B=a line from field 2; $\bar{B}_n$=the average of line B; C=the cross-correlation; S=maximum pixel shift; F=(first pixel of the line)+S; L=(last pixel of the line)−S; m=pixel number in each line; and n=line number.

The error signal is used to adjust either the first or the second set of scan lines to correct for skew or blur in the second field of image data. The invention may be implemented in hardware or software depending on the application.

BRIEF DESCRIPTION OF THE DRAWINGS

FIG. 3 shows the first and second fields processed by the horizontal line registration system of the present invention and an image frame output thereby.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
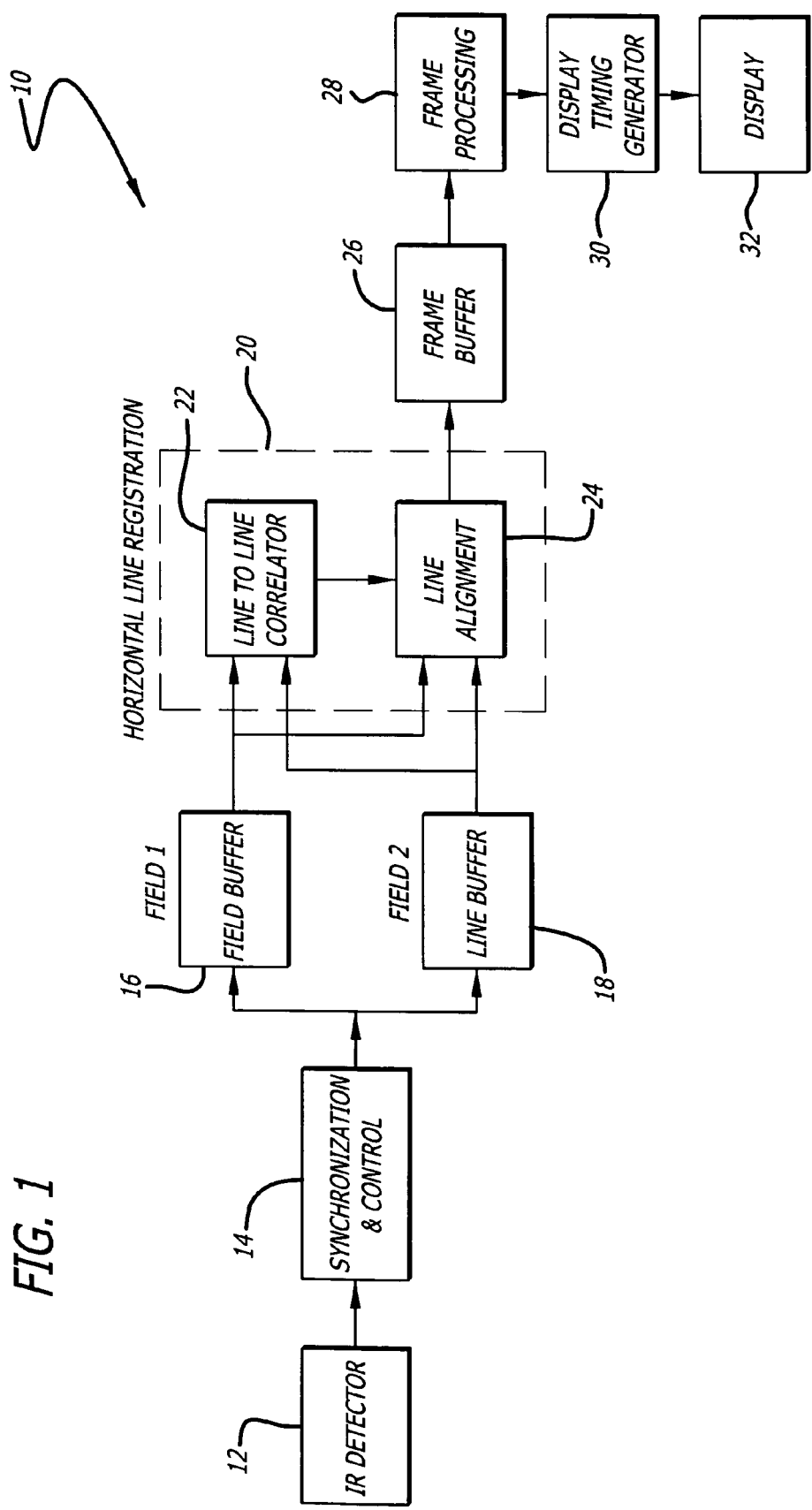
FIG. 1 is a block diagram of an image processing system implemented in accordance with an illustrative embodiment of the present teachings.

FIG. 1 is a block diagram of an image processing system implemented in accordance with an illustrative embodiment of the present teachings. As shown in FIG. 1, the system 10 is adapted for use with an infrared detector 12. Nonetheless, those of ordinary skill in the art will appreciate that the present teachings may be used with a source of visible image data or other image sources. The output of the infrared detector 12 is provided to a synchronization and control circuit 14. The synchronization, and control circuit 14 saves a first field of image data (for example the 'even' field) to a first buffer 16 and successive lines of a second field of image data (the 'odd') field to a second buffer 18.

In accordance with the present teachings, each line of the second field stored in the second buffer 18 is correlated to an adjacent line of the previous field in accordance with a horizontal line registration algorithm of the present invention. Horizontal line registration is implemented in hardware or in software by a horizontal line registration subsystem 20. The horizontal line registration subsystem 20 includes a line-to-line correlator 22 and a line alignment circuit 24.

Figure 2:
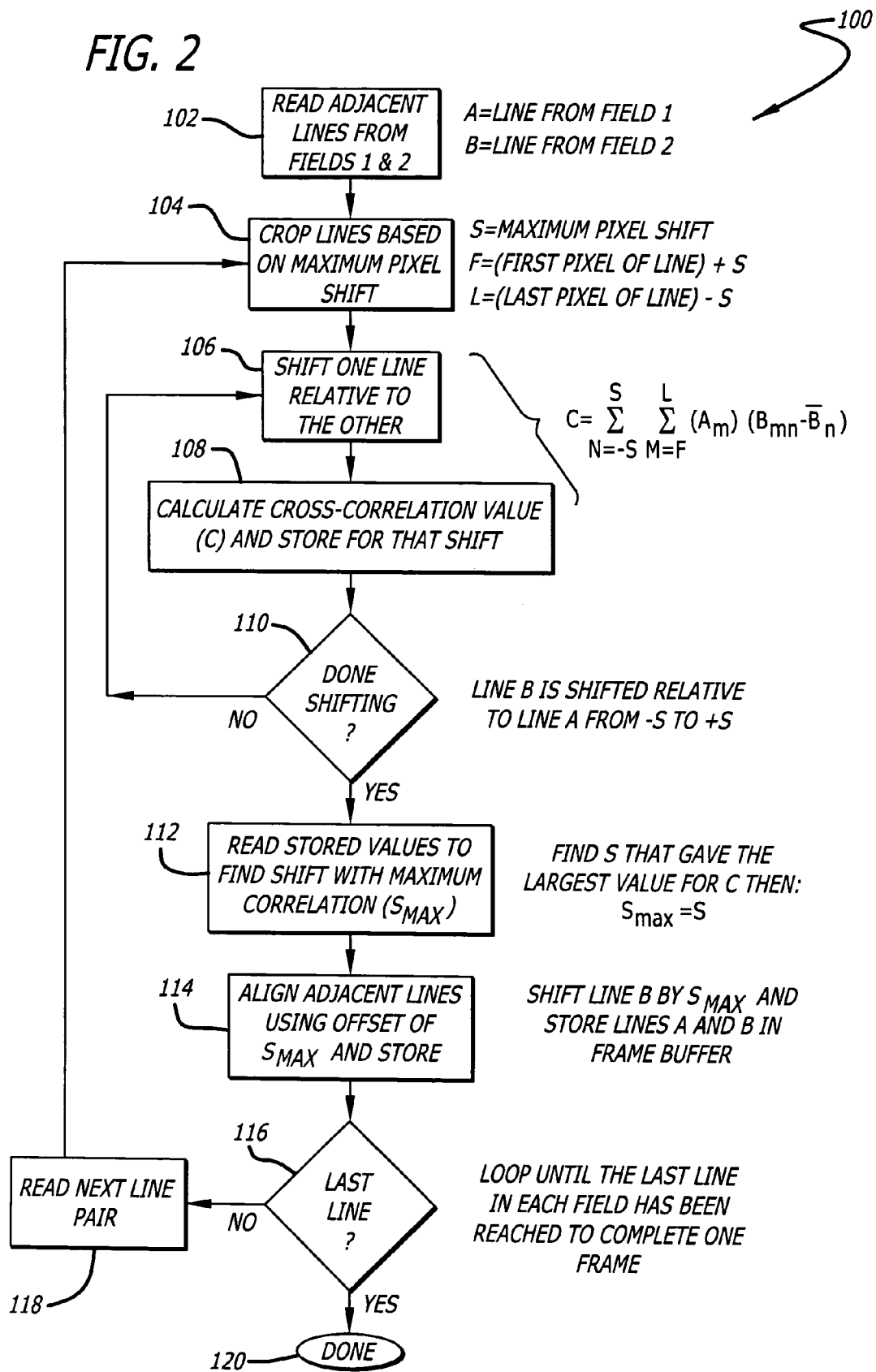
FIG. 2 is a flow diagram showing an illustrative implementation of the horizontal line registration process of the present invention in more detail.

FIG. 2 is a flow diagram showing an illustrative implementation of the horizontal line registration process of the present invention in more detail. As shown in FIG. 2, the process includes a first step 102 of reading adjacent lines from fields 1 and 2. At step 104, lines in the fields are cropped based on maximum pixel shift. At step 106 one line is shifted relative to the other. A first correlation is not necessary because the correlation is performed after each shift from −S to S. That means, one line is shifted by −S pixels from the other and the first correlation is performed. Then the line is shifted by −S+1 pixels and another correlation is done. This continues until S is reached which gives correlation results for all values within the range from −S to S, including zero.

At step 108, a cross-correlation value (C) is calculated and stored for the shift effected in step 106 as follows:

$$C = \sum_{n=-S}^{S} \sum_{m=F}^{L} (A_m)(B_{mn} - \overline{B}_n) \qquad [1]$$

where A=a line from field 1; B=a line from field 2; $\overline{B}_n$=the average of line B; C=the cross-correlation; S=maximum pixel shift; F=(first pixel of the line)+S; L=(last pixel of the line)−S; m=pixel number in each line; and n=line number.

During this process; line B is shifted relative to line A from −S to +S. When the shifting and correlation is complete, as tested at step 110, stored values are read to find the shift with a maximum correlation ($S_{max}$). At step 114, adjacent lines are aligned using the offset of $S_{max}$ and stored. That is, line B is shifted by $S_{max}$ and lines A and B are stored in a frame buffer 26 (See FIG. 1). Clearly, $S_{max}$ serves as an error signal by which the lines are adjusted.

At step 116, the loop continues by reading the next line pair at step 118 until the last line in each field is read to complete one frame. When the last line has been read, the process is complete at step 120. In general, one scheme for implementing the line adjustment process is as follows: the address pointer into memory that holds the original line is offset by the pixel shift. It is then copied into another part of memory to align it with the other field. In software, this would be done buy offsetting the index into the array that holds the line data by the pixel shift.

FIG. 3 shows the first and second fields processed by the horizontal line registration system of the present invention and an image frame output thereby. In FIG. 3, field 1 has the odd numbered lines and field 2 has the even numbered lines. In accordance with the present teachings the positions of the lines of one field (e.g., field 2) are adjusted relative to those of field 1. The two fields are combined and the lines thereof are interlaced to provide the resulting frame shown in FIG. 3.

Returning to FIG. 1, the buffered frame is forwarded to a processor 28 for processing in a conventional manner. The frame processor 28 is coupled to a timing generator 30 and the contents thereof are output on a display 32.

Thus, the present invention has been described herein with reference to a particular embodiment for a particular application. Those having ordinary skill in the art and access to the present teachings will recognize additional modifications applications and embodiments within the scope thereof. For example, those of ordinary skill in the art will appreciate that other cross-correlation schemes can be used to correlate the lines without departing from the scope of the invention. Further, other schemes may be used to cross-correlate fields without departing from the scope of the present teachings. In addition, a line in one field could be correlated to some combination of the lines above or below it in another field. For example, a line in field 1 could be correlated to an average of the line above and below it in field 2.

It is therefore intended by the appended claims to cover any and all such applications, modifications and embodiments within the scope of the present invention.

Accordingly,

What is claimed is:

1. An image processing system comprising:
   first means for providing a first set of scan lines in a first field of image data, said first means including a first buffer;
   second means for providing a second set of scan lines in a second field of image data, said second set of scan lines being interlaced relative to said first set of scan lines, said second means including a second buffer;
   third means for providing a line by line correlation between said first set of scan lines and said second set of scan lines and providing an error in response thereto, said third means including a line-to-line correlator, said correlation being:

$$C = \sum_{n=-S}^{S} \sum_{m=F}^{L} (A_m)(B_{mn} - \overline{B}_n) \qquad [1]$$

where A=a line from field 1; B=a line from field 2; $\overline{B}_n$=the average of line B; C=the cross-correlation; S=maximum pixel shift; F=(first pixel of the line)+S; L=(last pixel of the line)−S; m=pixel number in each line; and n=line number; and
   fourth means for adjusting said second set of scan lines in response to said error to correct for skew or blur in said second field of image data.

2. The invention of claim 1 wherein said fourth means includes means for effecting a line alignment.

3. The invention of claim 2 further including a frame buffer coupled to said fourth means.

4. The invention of claim 3 further including a frame processor coupled to said frame buffer.

5. The invention of claim 4 further including a display timing generator.

6. The invention of claim 1 further including means for computing a maximum pixel shift.

7. The invention of claim 6 further including means for cropping lines based on said maximum pixel shift.

8. An imaging system with blur and skew correction comprising:
   a first buffer;
   a second buffer; and
   a line-to-line correlator coupled to the first and second buffers, said correlation being:

$$C = \sum_{n=-S}^{S} \sum_{m=F}^{L} (A_m)(B_{mn} - \overline{B}_n) \qquad [1]$$

where A=a line from field 1; B=a line from field 2; $\overline{B}_n$=the average of line B; C=the cross-correlation; S=maximum pixel shift; F=(first pixel of the line)+S; L=(last pixel of the line)−S; m=pixel number in each line; and n=line number.

9. The invention of claim 8 further including a frame buffer coupled to said correlator.

10. The invention of claim 9 further including a frame processor coupled to said frame buffer.

11. The invention of claim 10 further including a display timing generator coupled to the frame processor.

12. The invention of claim 11 further including a display coupled to the timing generator.

13. The invention of claim 8 further including a line alignment adjuster for adjusting a position of lines of image data stored in a second buffer relative to a position of lines of image data stored in said first buffer.

14. An image processing method including the steps of:
providing a first set of scan lines in a first field of image data;
providing a second set of scan lines in a second field of image data, said second set of scan lines being interlaced relative to said first set of scan lines; and
providing a line by line correlation between said first set of scan lines and said second set of scan lines and providing an error in response thereto, said correlation being $$C = \sum_{n=-S}^{S} \sum_{m=F}^{L} (A_m)(B_{mn} - \overline{B}_n) \quad [1]$$

where A=a line from field 1; B=a line from field 2; $\overline{B}_n$=average of line B; C=the cross-correlation; S=maximum pixel shift; F=(first pixel of the line)+S; L=(last pixel of the line)−S; m=pixel number in each line; and n=line number.

15. The invention of claim 14 further including the step of adjusting said second set of scan lines in response to said error to correct for skew or blur in said second field of image data.

* * * * *